(12) United States Patent
Patterson et al.

(10) Patent No.: US 8,577,893 B1
(45) Date of Patent: Nov. 5, 2013

(54) RANKING BASED ON REFERENCE CONTEXTS

(75) Inventors: Anna Patterson, San Jose, CA (US); Paul Haahr, San Francisco, CA (US)

(73) Assignee: Google Inc., Mountain View, CA (US)

( * ) Notice: Subject to any disclaimer, the term of this patent is extended or adjusted under 35 U.S.C. 154(b) by 2935 days.

(21) Appl. No.: 10/800,006

(22) Filed: Mar. 15, 2004

(51) Int. Cl.
*G06F 7/00* (2006.01)

(52) U.S. Cl.
USPC .......................................................... 707/748

(58) Field of Classification Search
USPC .......................................................... 707/6, 7
See application file for complete search history.

(56) References Cited

U.S. PATENT DOCUMENTS

| | | | |
|---|---|---|---|
| 5,848,407 A * | 12/1998 | Ishikawa et al. | 707/2 |
| 5,895,470 A * | 4/1999 | Pirolli et al. | 707/102 |
| 5,920,859 A * | 7/1999 | Li | 707/5 |
| 6,078,913 A * | 6/2000 | Aoki et al. | 707/2 |
| 6,144,973 A * | 11/2000 | Fujii et al. | 715/501.1 |
| 7,020,847 B1 * | 3/2006 | Holzheuer | 715/855 |
| 2002/0103798 A1 * | 8/2002 | Abrol et al. | 707/5 |
| 2003/0061214 A1 * | 3/2003 | Alpha | 707/7 |
| 2003/0110181 A1 * | 6/2003 | Schuetze et al. | 707/103 R |
| 2005/0071741 A1 * | 3/2005 | Acharya et al. | 715/500 |
| 2006/0184521 A1 * | 8/2006 | Ponte | 707/5 |
| 2007/0156761 A1 * | 7/2007 | Smith | 707/104.1 |

OTHER PUBLICATIONS

Co-pending U.S. Appl. No. 10/750,180, filed Dec. 31, 2003, and titled "Generating Hyperlinks and Anchor Text in HTML and Non-HTML Documents," 22 pages.

* cited by examiner

*Primary Examiner* — Belinda Xue
(74) *Attorney, Agent, or Firm* — Harrity & Harrity, LLP

(57) ABSTRACT

A system ranks documents based on contexts associated with the documents. The system identifies a reference in a first document, where the reference is associated with a second document. The system analyzes a portion of the first document associated with the reference, identifies a rare word (or words) from the portion, creates a context identifier based on the rare word(s), and ranks the second document based on the context identifier.

17 Claims, 9 Drawing Sheets

610 — PERHAPS THE MOST BEAUTIFUL OF ALL THE PLANETS, SATURN IS SURROUNDED BY AN ELEGANT AND INTRIGUING RING SYSTEM THAT IS HELD IN SUSPENSION BY INVISIBLE STRINGS OF GRAVITY. ALTHOUGH THE RING SYSTEM IS NO LONGER UNIQUE BECAUSE ALL OF THE GAS GIANT PLANETS HAVE RINGS, THE RINGS OF SATURN ARE MUCH MORE ELABORATE THAN THOSE OF ANY OF THE OTHER PLANETS. SATURN SHARES MANY FEATURES WITH ITS EVEN LARGER GAS GIANT NEIGHBOR JUPITER, BUT HAS VARIOUS UNIQUE FEATURES IN ITS OWN RIGHT.

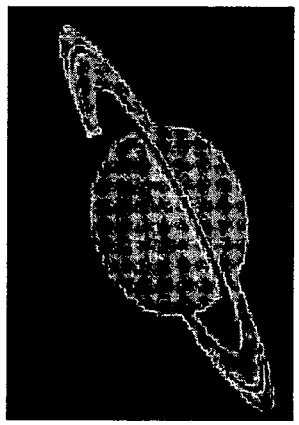

FIG. 6

RANKING BASED ON REFERENCE CONTEXTS

BACKGROUND OF THE INVENTION

1. Field of the Invention

Systems and methods consistent with the principles of the invention relate generally to information retrieval and, more particularly, to ranking documents based on the context of references associated with the documents.

2. Description of Related Art

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on search terms (called a search query) provided by the user. The goal of a search engine is to identify links to relevant search results based on the search query. Typically, the search engine accomplishes this by matching the terms in the search query to a corpus of pre-stored web documents. Web documents that contain the user's search terms are considered "hits" and are returned to the user.

The quality of the documents returned to the user depend on the quality of the ranking process used to rank the search results. For example, some ranking processes rank documents based on the number of links pointing to them, the ranks of the documents pointing to them, or the anchor text associated with the links pointing to them. Several techniques have arisen to artificially inflate the rank of a document, thereby degrading the quality of the search results.

One such technique relates to link-based spamming. Link-based spamming involves obtaining a large number of links to a particular document to increase the rank of the document. Link farms, for example, provide a network of web documents that are heavily cross-linked to each other so as to increase the ranks of the documents. Some spammers pay owners of highly ranked documents to include a link to their document so as to increase the rank of their document.

Another technique relates to anchor text spamming. Anchor text spamming involves obtaining a large number of web documents to link to a particular document using the same anchor text with which the document is to be associated. The desired result is that if a user provides a search query with terms that match the anchor text, then the document will be provided highly ranked in the search results.

Yet another technique relates to bombing (e.g., Google bombing). Bombing involves setting up a large number of documents with links that point to a specific document so that the document will obtain a high rank when users enter particular text associated with the link. One popular bomb involved a large number of documents including the anchor text "miserable failure" associated with a link to President Bush's biography. Therefore, whenever a user entered the search query "miserable failure," the highest ranked result was a link to President Bush's biography.

A further technique relates to the use of standard frames that are associated with a number of web documents. Standard frames sometimes include "products" links, "jobs" links, "investor" links, etc. that are typically associated with business web sites. Oftentimes, the business will include these same links on every document associated with its web site. This duplication of links may artificially inflate the ranks of the documents associated with these links, especially when the web site includes a large number of documents.

All of these techniques degrade the quality of the search results returned by a search engine.

SUMMARY OF THE INVENTION

According to one aspect consistent with the principles of the invention, a method may include identifying a link in a first document, where the link is associated with a second document. The method may also include analyzing a first portion of text to the left of the link in the first document, analyzing a second portion of text to the right of the link in the first document, identifying a first rare word from the text in the first portion, identifying a second rare word from the text in the second portion, and creating a context identifier based on the first and second rare words. The method may further include ranking the second document based on the context identifier.

According to another aspect, a system may include a document analyzing component and a document ranking component. The document analyzing component may identify a reference in a first document, where the reference is associated with a second document. The document analyzing component may also analyze a portion of the first document associated with the reference, and create a context identifier based on the analyzed portion. The document ranking component may rank the second document based on the context identifier.

According to yet another aspect, a method may include determining a set of different contexts associated with references to a document and ranking the document based on the set of different contexts associated with the references.

According to a further aspect, a method may include identifying a reference to a document, identifying data associated with the reference, determining a context associated with the reference based on the identified data, and ranking the document based on the context associated with the reference.

According to another aspect, a method may include locating references that point to a document, grouping the references into groups based on contexts of the references, and ranking the document based on the contexts of the groups of the references.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is a diagram of an exemplary web document;

DETAILED DESCRIPTION

The following detailed description of the invention refers to the accompanying drawings. The same reference numbers in different drawings may identify the same or similar elements. Also, the following detailed description does not limit the invention.

Overview

When a user performs a search of a corpus of documents, such as the Internet, the user enters a search query into a search engine. In an ideal situation, the search engine returns documents (or more often links to the documents) that are on topic, with the more relevant documents being ranked higher than the less relevant documents. Techniques, such as link-based spamming, anchor text spamming, bombing, and use of standard frames, may disrupt the operation of the search engine. For example, these techniques may be used to cause off topic documents to be included in search results or to increase the rank of an on topic, but lowly ranked, document.

There are several reasons why someone might use one of these techniques to artificially inflate the rank of a document. One reason may be financially based. Many document owners will pay to have their document highly ranked. Highly ranked documents are typically selected more frequently by users than less highly ranked documents. Other reasons may include disrupting the search engine, humiliating the search engine company, or no reason at all. For example, a spammer may think it is funny that a document relating to President Bush's biography is the highest ranked search result when a user enters the query "miserable failure."

Systems and methods consistent with the principles of the invention may improve the quality of search results by determining the context of the links (or the documents pointed to by the links or anchor text associated with the links) in the search results and ranking the documents pointed to by the links based on this context. By using the context of the links as a factor in ranking the associated documents, artificially inflated rankings using techniques, such as link-based spamming, anchor text spamming, bombing, and use of standard frames, may be reduced.

Exemplary Network Configuration

Figure 1:
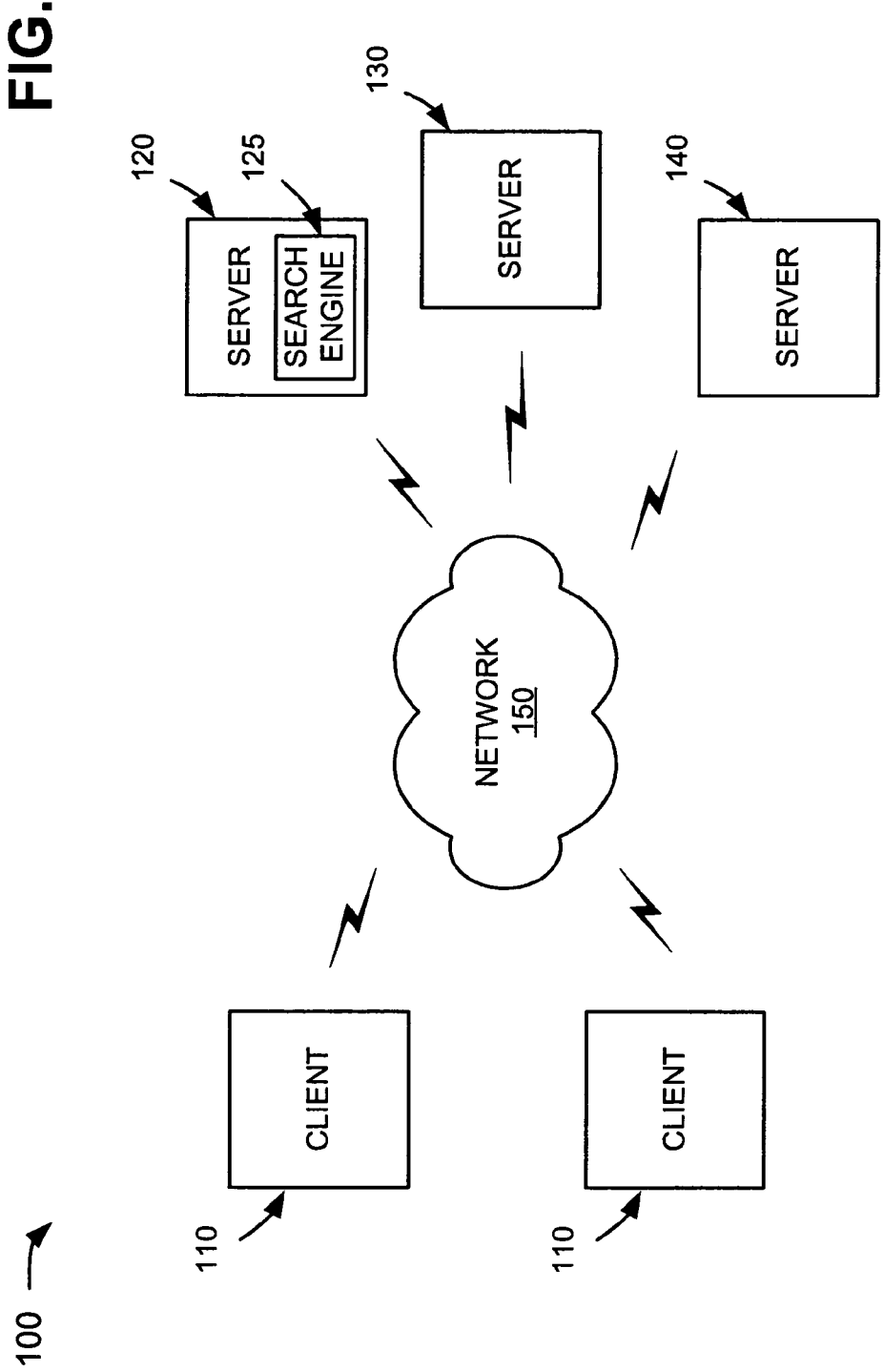
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may crawl a corpus of documents (e.g., web pages), index the documents, and store information associated with the documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). Also, a "link," as the term is used herein, is to be broadly interpreted to include any reference to or from a document.

Exemplary Client/Server Architecture

Figure 2:
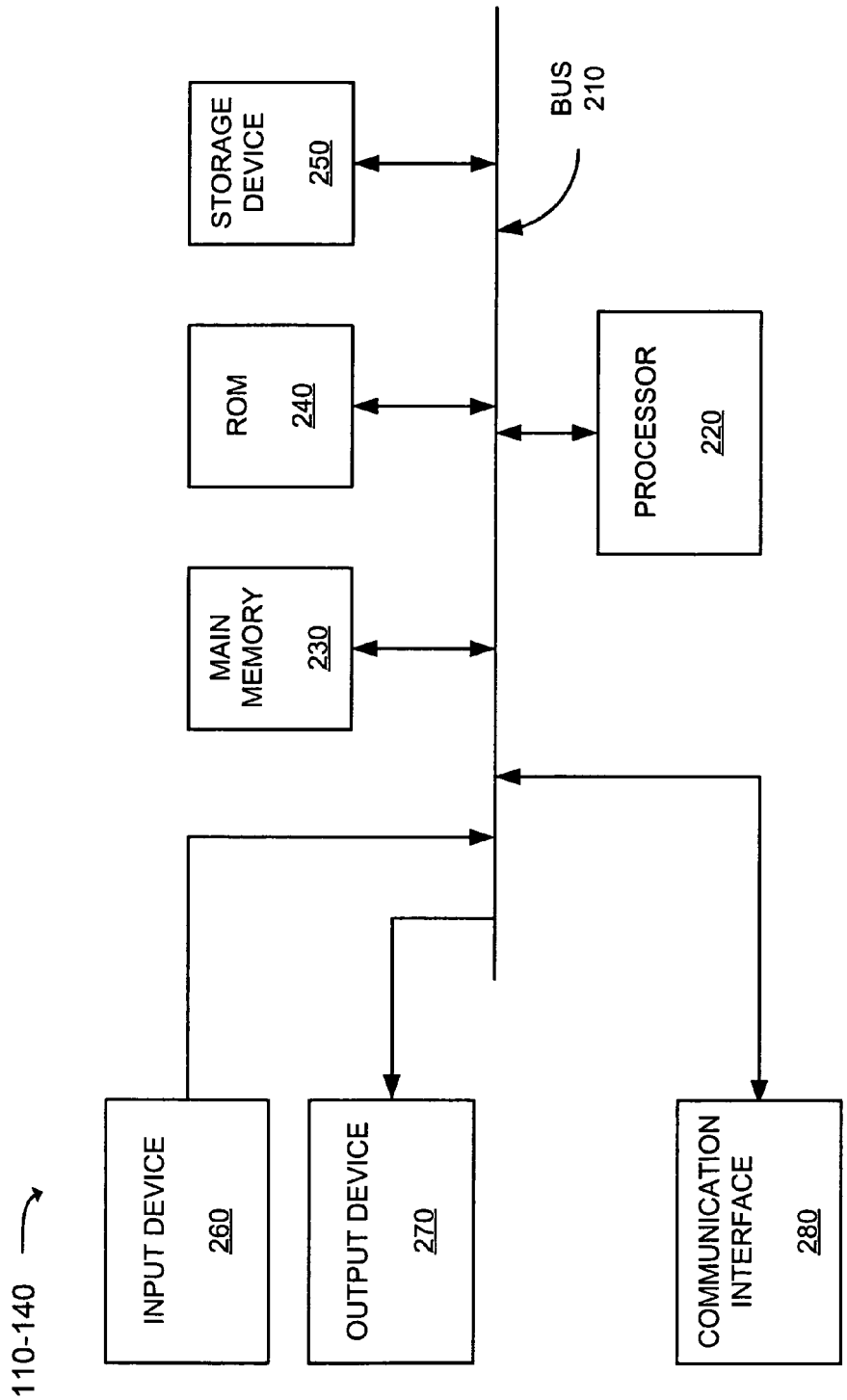
FIG. 2 is an exemplary diagram of a client and/or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, may perform certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Server

Figure 3:
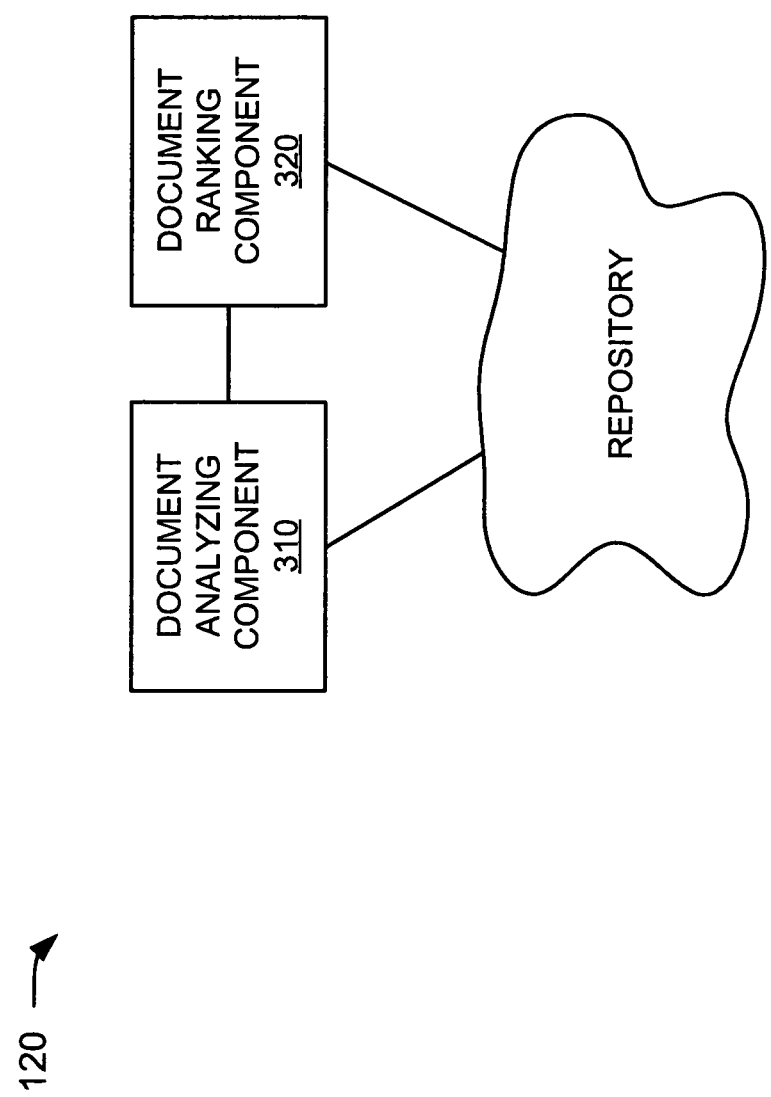
FIG. 3 is an exemplary functional block diagram of a portion of a server of FIG. 1 according to an implementation consistent with the principles of the invention.

FIG. 3 is an exemplary functional block diagram of a portion of server 120 according to an implementation consistent with the principles of the invention. According to one implementation, one or more of the functions described below may be performed by search engine 125. According to another implementation, one or more of these functions may be performed by an entity external to server 120, such as a computer associated with server 120 or one of servers 130 and 140.

Server 120 may include a document analyzing component 310 and a document ranking component. Document analyzing component 310 may parse documents in a document corpus during, for example, an indexing or crawling process. While parsing the documents, document analyzing component 310 may identify the links (or other references) that the documents contain.

There are many ways that document analyzing component 310 may identify links. For example, when the documents correspond to hypertext markup language (HTML) documents, links may be identified by special HTML characters. In HTML, a link may take the form of <A HREF="target link">anchor text</A>, where the target link may correspond to an address (e.g., a uniform resource locator (URL)) associated with a document and the anchor text may include a word or phrase associated with the target link. Other ways of identifying links in documents are disclosed in, for example, U.S. patent application Ser. No. 10/750,180, entitled "Generating Hyperlinks and Anchor Text in HTML and Non-HTML Documents," filed Dec. 31, 2003, and naming Vibhu Mittal as inventor, the disclosure of which is hereby incorporated by reference.

Document analyzing component 310 may then analyze a window of text to the left of the link and a window of text to the right of the link. In one implementation, the window size may include five words. In other implementations, the window size may include more or fewer words.

Document analyzing component 310 may identify a rare word in the left window and a rare word in the right window. Several techniques may be used to identify the rare word. For example, an inverse document frequency (IDF) weighting technique or a conventional linguistic modeling technique may be used. One such technique may involve analyzing a corpus of documents and creating a hash table based on the words in the documents. For example, each word in a document may be identified and hashed. The count value in the corresponding entry in the hash table may then be incremented. Once the corpus has been analyzed, the count values may reflect which words occurred more often and which words occurred less often. Document analyzing component 310 may identify rare words in the left and right windows based on the hash table.

In one embodiment, rarest words are identified. The rarest words may be the rarest "real" words, excluding blocks of text that are not words, such as random blocks of text that include symbols or numbers. One technique may identify a real word as one that occurs at least a minimal number of times on a number of different documents. For example, a "real" word may include one that occurs at least fifty times on many different documents.

Document analyzing component 310 may then create a context identifier, such as a fingerprint, based on the rare word in the left window and the rare word in the right window. In one implementation, the context identifier may be generated by hashing the words. The context identifier may represent the context of the corresponding link.

Figure 4:
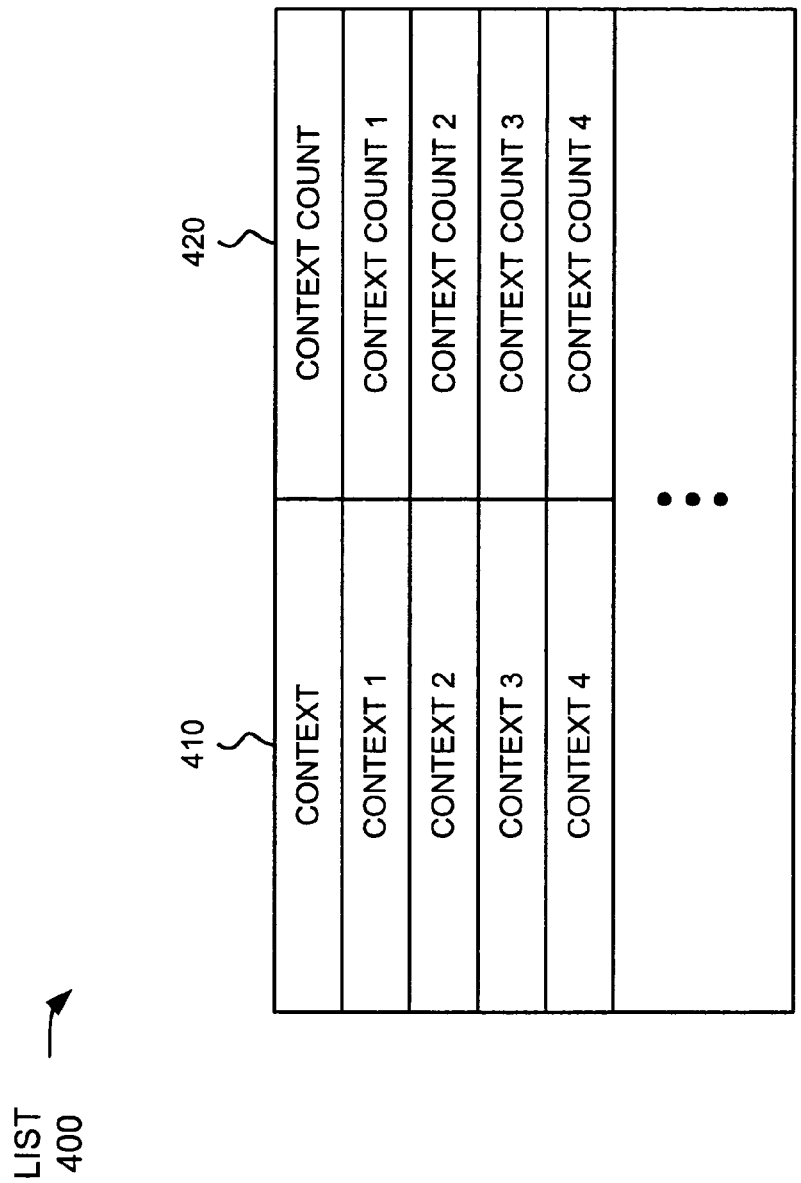
FIG. 4 is an exemplary diagram of a list that may be created according to an implementation consistent with the principles of the invention.

Document analyzing component 310 may then create a list of contexts and corresponding context counts for all links pointing to a document. FIG. 4 is an exemplary diagram of a list 400 according to an implementation consistent with the principles of the invention. List 400 may include a context field 410 and a context count field 420. Context field 410 may store a context identifier that was created as described above. Context count field 420 may store a count value corresponding to the number of occurrences of the associated context identifier. In other words, context count field 420 may store a value representing the number of times that the rare words occurred in association with links to this document.

Returning to FIG. 3, document ranking component 320 may use a set of factors when ranking a document. One such factor may be based on the list (e.g., list 400) created by document analyzing component 310. For example, document ranking component 320 may use the number of different contexts (which may correspond to the number of entries in the list) for a document to determine a ranking score for the document. Other factors in the set may include the number of links to the document, the importance of the documents linking to the document, the freshness of the documents linking to the document, and/or other known ranking factors.

According to another implementation, document ranking component 320 may consider the distribution of the context counts to discount contexts originating from possible spamming techniques. For example, assume that a document has links with four associated contexts: context 1, context 2, context 3, and context 4. Assume further that context 1 has a corresponding context count of 10,000; context 2 has a corresponding context count of 10; context 3 has a corresponding context count of 4; and context 4 has a corresponding context count of 1. Document ranking component 320 may discount context 1 as suspicious (e.g., possibly machine generated). For example, document ranking component 320 may determine that the document has links with three associated contexts (contexts 2-4). Document ranking component 320 may then rank the document accordingly.

According to yet another implementation, document ranking component 320 may consider the distribution history of the context counts to determine the rank of the document. For example, assume that in a first time period, a document has links with two associated contexts: context A with a corresponding context count of 20 and context B with a corresponding context count of 20. Assume further that in the next time period, the same document has links with three associated contexts: context A with a corresponding context count of 20, context B with a corresponding context count of 20, and context C with a corresponding context count of 18,000. Therefore, there are two contexts with a total context count of 40 in the first time period and three contexts with a total context count of 18,040 in the next time period. Based on this large change in the distribution of the context counts, document ranking component 320 may identify the document as suspicious and rank it accordingly.

Exemplary Processing

Figure 5:
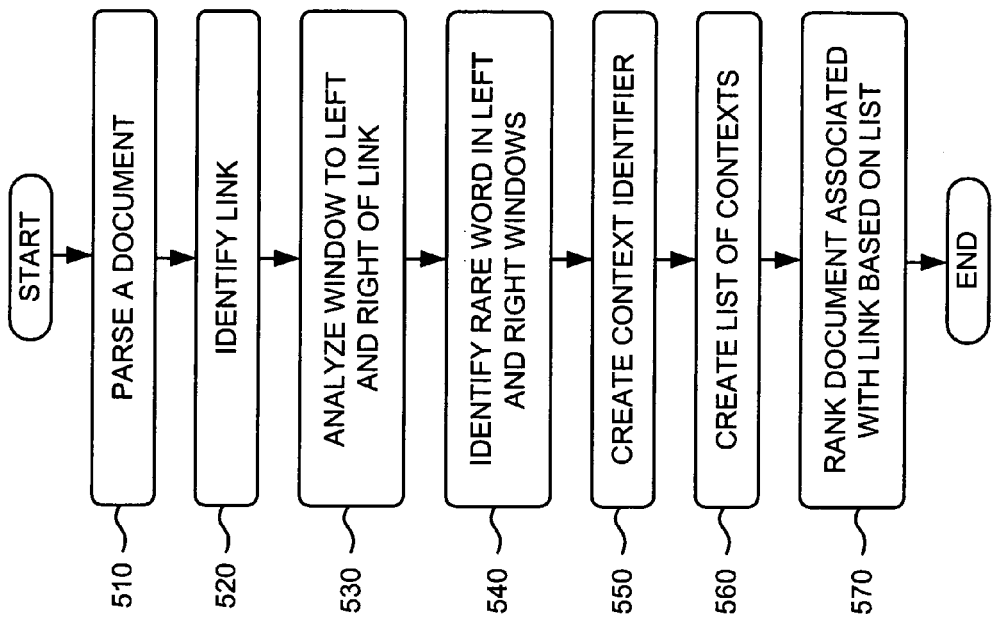
FIG. 5 is flowchart of processing for ranking a document according to an implementation consistent with the principles of the invention.

FIG. 5 is a flowchart of exemplary processing for ranking a document according to an implementation consistent with the principles of the invention. Processing may begin with a document (different from the document being ranked) being parsed (act 510). This document may be one document in a corpus of documents. The parsing may be performed in connection with an indexing or crawling operation.

While parsing the document, a link (which may include an address and its associated anchor text) pointing to the document to be ranked may be identified (act 520). When the document corresponds to a HTML document, the link may be identified by special HTML characters. A window of text to the left of the link and a window of text to the right of the link may then be analyzed (act 530). In one implementation, the window size may include five words. In other implementations, the window size may include more or fewer words (e.g., fifteen words).

A rare (or rarest) word in the left window and a rare (or rarest) word in the right window may then be identified (act 540). As described above, an IDF weighting or linguistic modeling technique may be used to identify the rare words. According to another implementation, a rare phrase (combination of words) in the left window and a rare phrase in the right window may be identified. As described above, a rare word (or phrase) may be one that occurs at least a minimal number of times on many different documents.

A context identifier, such as a fingerprint, based on the rare word in the left window and the rare word in the right window may then be created (act 550). In one implementation, the context identifier may result from a hashing function being performed on the words. For example, each word may be hashed individually or after combining them to form the context identifier. The context identifier may represent a context of the corresponding link.

A list of contexts and corresponding context counts for links pointing to the document (i.e., the document being ranked) may then be created (act 560). One implementation of such a list is illustrated in FIG. 4. Each of the contexts may correspond to a different context identifier associated with a link to the document. Each of the context counts may correspond to the number of occurrences of the context identifier in association with links to the document that appear in the different documents in the corpus.

The document associated with the links may then be ranked based on the list (act 570). For example, the document may be ranked based on the number of different contexts associated with the links (e.g., the number of entries in the list), the distribution of context counts associated with the different contexts, and/or the distribution history of the context counts. One, or a combination, of these factors may be used alone, or in combination with other ranking factors, to generate a ranking score for the document.

When a search query is subsequently received from a user, relevant documents may be identified. The documents may then be ranked using ranking factors, as described above. Alternatively, each document in the corpus may have its rank pre-calculated, as described above. The relevant documents may then be quickly ranked by looking up the pre-calculated ranks.

EXAMPLE

FIG. 6 is a diagram of an exemplary web document. This particular document relates to the planet Saturn. The document may be parsed to identify the links that it contains. This example document includes a single link 610. Link 610 may be identified by analyzing the document's HTML code. In this case, link 610 is included in the sentence "Perhaps the most beautiful of all the planets, Saturn is surrounded by an elegant and intriguing ring system that is held in suspension by invisible strings of gravity."

Figure 7:
FIG. 7 is a diagram of exemplary hypertext markup language code that represents a link in FIG. 6.

FIG. 7 is a diagram of exemplary HTML code that represents link 610. The HTML code may include a target link 710 and anchor text 720. Target link 710 identifies a URL corresponding to "www.planetsaturn.com." Anchor text 720 identifies anchor text of "Saturn."

Figure 8:
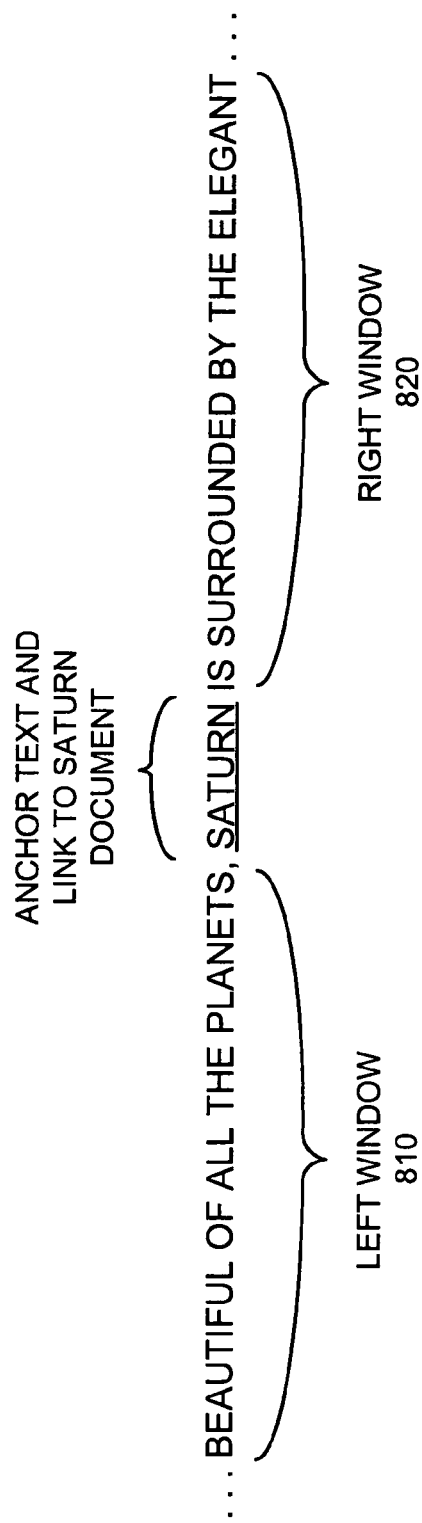
FIG. 8 is an exemplary diagram of windows of text to the left and right of the link in FIG. 6.

A window of text (e.g., five words) to the left of link 610 and a window of text (e.g., five words) to the right of link 610 may then be analyzed. FIG. 8 is a diagram of exemplary windows of text to the left and right of link 610. Left window 810 includes the words "beautiful of all the planets" and right window 820 includes the words "is surrounded by the elegant."

The rarest word in left window 810 and the rarest word in right window 820 may then identified. Assume that the rarest word in left window 810 is "planets" and the rarest word in right window 820 is "elegant."

A context identifier based on the rarest word in left window 810 ("planets") and the rarest word in right window 820 ("elegant") may then be created. Assume that a hashing function performed on these two words results in a number of 112. The number 112 may then represent the context of link 610.

Figure 9:
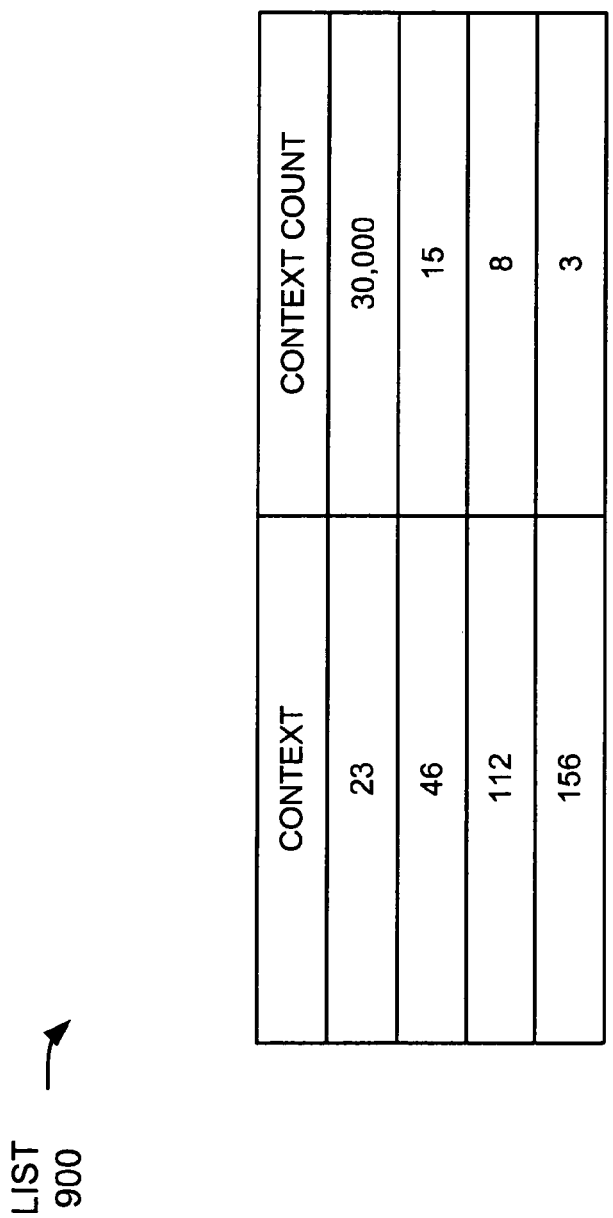
FIG. 9 is an exemplary diagram of a list associated with the link in FIG. 6.

A list of contexts and corresponding context counts for links, such as link 610, that refer to www.planetsaturn.com may then be created. FIG. 9 is a diagram of an exemplary list 900 associated with link 610. Assume that list 900 includes four entries corresponding to contexts 23, 46, 112, and 156. Assume that the context count for context 23 is 30,000; the context count for context 46 is 15; the context count for context 112 is 8; and the context count for context 156 is 3.

The document associated with these links (e.g., www.planetsaturn.com) may then be ranked based on list 900. For example, the document may be ranked based on the number of different contexts associated with the links, the distribution of context counts associated with the different contexts, and/or the distribution history of the context counts. One, or both, of these factors may be used alone, or in combination with other ranking factors, to generate a ranking score for the document. In this case, context 23 may be determined to be suspicious due to its disparate context count compared to the other contexts. Context 23 may then be eliminated from, or its contribution reduced in, the ranking process.

CONCLUSION

Systems and methods consistent with the principles of the invention may improve the ranking of documents based on the context of the links pointing to the documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, it has been described that a window of text to the left of a link and a window of text to the right of the link may be analyzed to determine a context associated with the link. In other implementations, other data (text or non-text) may be used to determine the context associated with a link, such as any portion of the document associated with the link. For example, data surrounding the link, data to the left of the link or to the right of the link, or anchor text associated with the link may be used to determine the context associated with the link.

Further, while a series of acts has been described with regard to FIG. 5, the order of the acts may be modified in other implementations consistent with the principles of the invention. Further, non-dependent acts may be performed in parallel.

In one implementation, server 120 may perform most, if not all, of the acts described with regard to the processing of FIG. 5. In another implementation consistent with the principles of the invention, one or more, or all, of the acts may be performed by another entity, such as another server 130 and/or 140 or client 110.

Also, it has been described that document ranking component 320 may consider the distribution or distribution history of the context counts to discount contexts that were deemed suspicious. In the examples given above, a single context has been described as being identified as suspicious. In other implementations, multiple contexts may be deemed suspicious based on the distributions and/or distribution history of their context counts.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, comprising:
   identifying a link in a first document, the link being associated with a second document;
   analyzing a first portion of text to the left of the link in the first document;
   analyzing a second portion of text to the right of the link in the first document;
   identifying a first rare word from the text in the first portion, where the first rare word is identified as a rare word based on a frequency of occurrence of the first rare word in a set of documents;
   identifying a second rare word from the text in the second portion, where the second rare word is identified as a rare word based on a frequency of occurrence of the second rare word in the set of documents;
   creating a context identifier based only on the first and second rare words; and
   ranking the second document within a list of search results based on the context identifier.

2. The method of claim 1, where identifying a first rare word and identifying a second rare word comprise:
   comparing words in the first and second portions to a table that identifies occurrences of a plurality of words in the set of documents, and
   determining which of the words in the first and second portions occurred least often in the set of documents based on the table.

3. The method of claim 1, where creating a context identifier comprises:
   hashing the first and second rare words to create the context identifier.

4. The method of claim 1, where the first document comprises a plurality of first documents that include a link to the second document;
   where creating a context identifier comprises:
   creating a plurality of context identifiers associated with the plurality of first documents; and
   where the ranking the second document comprises:
   generating a ranking score for the second document based on the context identifiers.

5. The method of claim 4, where generating a ranking score for the second document comprises:
   ranking the second document based on a total number of the context identifiers.

6. The method of claim 4, further comprising:
   determining a number of occurrences of the context identifiers in association with the link as context counts.

7. The method of claim 6, where generating a ranking score for the second document comprises:
   ranking the second document based on a distribution of the context counts associated with the context identifiers.

8. The method of claim 7, where ranking the second document based on a distribution of the context counts comprises:
   identifying a one of the context identifiers based on a distribution of the context counts, and
   ranking the second document while reducing an impact of the one of the context identifiers.

9. The method of claim 6, where generating a ranking score for the second document comprises:
   ranking the second document based on a history of distribution of the context counts associated with the context identifiers.

10. The method of claim 1, where ranking the second document comprises:
    generating a ranking score based on the context identifier, and
    using the ranking score as one of a plurality of factors when ranking the second document.

11. The method of claim 1, where each of the first and second portions comprises a plurality of words.

12. A system, comprising:
    a memory to store instructions; and
    a processor to execute the instructions to implement:
    means for identifying a link in a first document, the link being associated with a second document;
    means for analyzing a first portion of the first document located to the left of the link in the first document;

means for analyzing a second portion of the first document located to the right of the link in the first document;

means for identifying a first rarest word from the first portion of the first document;

means for identifying a second rarest word from the second portion of the first document;

means for creating a context identifier based only on the first rarest word and the second rarest word; and means for ranking the second document based on the context identifier.

13. The system of claim 12, where the means for creating a context identifier comprises:

means for hashing the first and second rare words to create the context identifier.

14. The system of claim 12, where the means for ranking the second document comprises:

means for generating a ranking score based on the context identifier, and means for using the ranking score as one of a plurality of factors when ranking the second document.

15. A system, comprising:

a memory to store instructions; and a processor to execute the instructions to implement:

a document analyzing component to:

identify a reference in a first document, the reference being associated with a second document, analyze a first portion of the first document located to the left of the reference in the first document, analyze a second portion of the first document located to the right of the reference in the first document, identify a first rare word or rare phrase from the first portion of the first document;

identify a second rare word or rare phrase from the second portion of the first document; and create a context identifier based only on the first rare word or rare phrase and the second rare word or rare phrase; and a document ranking component to rank the second document based on the context identifier.

16. The system of claim 15, where the first portion and the second portion are areas of text, and where the first rare word or rare phrase and the second rare word or rare phrase are identified based on a frequency of occurrence of the first and second rare words or rare phrases in a set of documents.

17. A method performed by a device, comprising:

determining a plurality of different contexts associated with references to a document, the determining the plurality of different contexts comprising:

parsing a plurality of first documents to identify the references to the document, analyzing first portions of text to the left of the references in the plurality of first documents, analyzing second portions of text to the right of the references in the plurality of first documents, and identifying the plurality of different contexts based on the text in the first and second portions, where identifying the plurality of different contexts comprises:

identifying first rare words from the text in the first portions, identifying second rare words from the text in the second portions, and creating context identifiers based on the first and second rare words, the context identifiers corresponding to the plurality of different contexts, where the first and second rare words are identified based on a frequency of occurrence of the first and second rare words in a set of documents; and ranking the document within a list of search results based on the plurality of different contexts associated with the references, where ranking the document includes:

generating a ranking score based on the plurality of different contexts, and using the ranking score as one of a plurality of factors when ranking the document.

\* \* \* \* \*